Figures 1, 2:
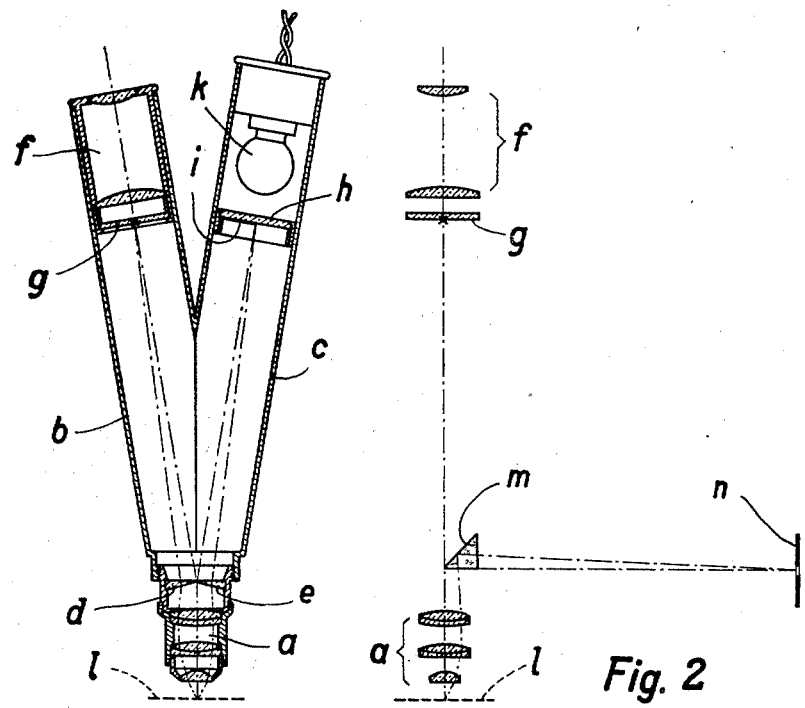

Sept. 24, 1940.  O. M. I. EPPENSTEIN ET AL  2,216,003
MICROSCOPE FOR EXAMINING PROFILES OF SURFACES OF BODIES
BY THE OPTICAL INTERSECTION METHOD
Filed May 26, 1939

Inventors:
Ho Martin Israel Eppenstein
Clemens Münster

Patented Sept. 24, 1940

2,216,003

UNITED STATES PATENT OFFICE 2,216,003

MICROSCOPE FOR EXAMINING PROFILES OF SURFACES OF BODIES BY THE OPTICAL INTERSECTION METHOD

Otto Martin Israel Eppenstein and Clemens Münster, Jena, Germany, assignors to the firm Carl Zeiss, Jena, Germany Application May 26, 1939, Serial No. 275,892
In Germany June 4, 1938

3 Claims. (Cl. 88—39)

Application has been filed in Germany June 4, 1938.

Optical intersection is a known proceeding for examining the profiles of surfaces of bodies by means of a microscope the axis of the observation system of which intersects on the surface to be examined the axis of an illumination system imaging on this surface an optical boundary line. In other words, an illuminated plane section is made in the surface to be examined, and this section is viewed at an angle to the direction of the illumination rays.

The said optical intersection method has been carried into practice by using a microscope having an optical system of the usual kind, viz. an eye-piece and a microscope objective imaging the object plane in the focal plane of the eye-piece, and a system imaging in the object plane an optical boundary line due to a slit or a knife-edge. The microscopic observation system and the optical system imaging the boundary line are placed into two different tubes including an angle which is generally greater than 60° and in most cases even as great as 90°. Also the optical system for imaging the boundary line is a microscopic objective. As the points of intersection of the optical axes and the object plane of both objectives are required to coincide, objectives are to be used which are corrected for a comparatively great distance from the object. The aperture of an objective of this kind is, however, comparatively small and, accordingly, the magnification to be obtained in the microscope is restricted. Moreover, the space required by the two objectives inclined relatively to each other excludes at the outset any examination of the interior surfaces of narrow bores.

The invention overcomes these disadvantages by providing that the microscope objective for observation purposes constitutes at the same time a system for imaging the object in the focal plane of the eye-piece and the boundary line in the object plane and disposing approximately in the plane of the exit pupil of this objective a ray dividing system which bisects the exit pupil and directs the imaging rays of the boundary line through the one half of the objective to the object plane and the imaging rays of the object plane through the other half of the objective to the focal plane of the eye-piece. When one common objective is thus used for both ray paths, this objective can have an aperture of great magnitude, so that the said restriction of the magnification is removed in spite of only one half of the aperture of the objective being at disposal for the illumination and only one half for the observation. As one objective naturally occupies only a comparatively small space, it is possible to examine objects which are beyond the reach of the instrument known so far. The ray dividing system can be constructed in different manners. Similarly to the known vertical illuminators, the said system can have at least one reflecting surface, which covers half the exit pupil of the microscope objective. Instead of this construction as a reflecting system, use can be made, however, of a system based on the deviating effect of at least one refracting prism.

There is naturally no objection to placing the ray dividing system into a plane conjugate to the plane of the exit pupil of the microscope instead of into the plane of the exit pupil itself. The ray dividing system lies in this case in a plane in which the exit pupil is imaged by one part of the optical observation system. This constructional form is especially suitable for the examination of long narrow bores and can be easily achieved when the microscope eye-piece is terrestric, so as to produce another image of the viewed object by means of a reversing system. If a collective system is disposed approximately at the place of the reversed image which is produced by the microscope objective and which is reversed another time by the reversing system in order to appear as a second image, the collective system images the exit pupil in the neighbourhood of the reversing system. Giving the ray dividing system the said position does not change the effect of the instrument.

Instead of viewing the object image subjectively through the eye-piece, it is possible, moreover, to project this image by means of the microscope on a screen or a layer sensitive to light. In the imaging of the object by means of the microscope objective, the rays are not, as is well known, permitted to converge in the focal plane of the projection eye-piece, but in a plane nearer the object, so that the object image appears at a finite distance.

Figure 3:
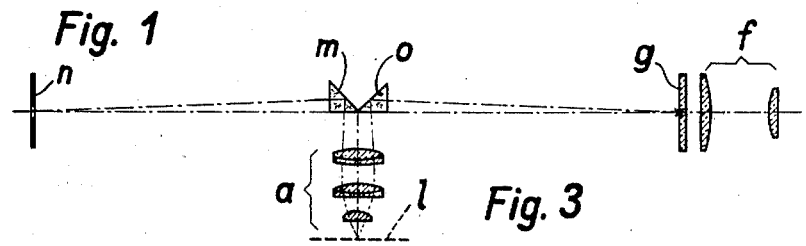
Figure 4:
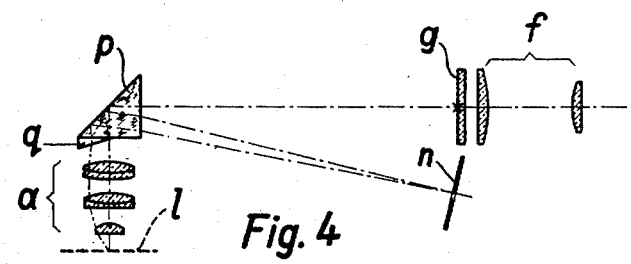

In the accompanying drawing, which illustrates the invention, Figure 1 shows one constructional example in elevational section, and Figures 2, 3 and 4 show schematically in axial sections the optical parts of a second, a third and a fourth constructional example, respectively.

The first constructional example (Figure 1) is a microscope having a microscope objective $a$, which consists of three members, and two tubes $b$ and $c$ including an acute angle. Approximately at the place of the exit pupil of the microscope objective $a$ are disposed two glass wedges $d$ and $e$, which are of the same form and size and whose refracting edges touch each other in a line dividing the exit pupil into halves. The tube $b$, which is the observation tube, has an eye-piece $f$ consisting of two lenses. In the focal plane of the eye-piece $f$ is disposed a glass plate $g$ bearing a mark for effecting measurements in the image of the object. The tube $c$, which is the illumination tube, contains a ground glass plate $h$ half the lower surface of which bears an opaque layer $i$, this lower surface lying at the same distance from the microscope objective $a$ as the plane of the mark on the plate $g$. The tube $c$ contains also an incandescent lamp $k$ near the glass plate $h$.

The glass wedges $d$ and $e$ deviate the halves of the ray pencil leaving the microscope objective $a$ substantially parallel to the axes of the tubes $b$ and $c$. The objective $a$ produces in the plane of the mark on the glass plate $g$ an image of an object lying in the object plane $l$. The ground glass plate $h$ illuminated by the incandescent lamp $k$ constitutes a secondary light source, and the surface bearing the layer $i$ is imaged by the microscope objective $a$ in the object plane $l$. The edge of the image of the layer $i$, which lies across the object field and is the optical boundary line constitutes the optical section of that surface of the object which lies in the plane $l$. By viewing the object through the tube $b$ in the known manner, it is thus possible to determine the profile of this surface.

The microscope according to the second constructional example (Figure 2) contains likewise a microscope objective $a$ and an eye-piece $f$ having a glass plate $g$. Approximately in the exit pupil of the objective $a$ is disposed a prism $m$, which has a reflecting hypotenuse covering half the exit pupil. Laterally of the microscope, a diaphragm $n$ having an illuminated slit is so disposed opposite the prism $m$ that the ray path from the slit of the diaphragm $n$ through the prism $m$ to the microscope objective $a$ corresponds to the ray path from this objective $a$ to the plane containing the mark of the glass plate $g$.

The third constructional example (Figure 3) differs from the second example only in that also the path of the imaging rays in the microscope is bent, and not straight. Adjacent the prism $m$ is a prism $o$, which is of the same form and size and whose reflecting surface covers the other half the exit pupil of the objective $a$. As in the first constructional example, an optical boundary line is produced in the object plane $l$ of the second and third examples. The said boundary line is in these cases the image of an edge of the luminous slit of the diaphragm $n$, which is produced by the prism $m$ and the one half of the objective $a$. The observation is effected through the eye-piece $f$, on the glass plate $g$ of which the other half of the objective $a$ produces an image of the object plane.

The microscope according to the fourth example (Figure 4) consists likewise of an objective $a$ and an eye-piece $f$ having a glass plate $g$. The ray path of the microscope is deviated by a prism $p$ having a reflecting hypotenuse and covering the entire exit pupil of the objective $a$. To the light entrance surface of the prism $p$, a glass wedge $q$ is cemented in such a manner that the refracting edge of the prism $p$ bisects the exit pupil and the wedge $q$ covers accordingly half this pupil. Sidewardly of the glass plate $g$, a diaphragm $n$ having an illuminated slit is so disposed that the light rays proceeding therefrom are made to take such a way through the prism $p$ and the wedge $q$ to the objective $a$ as corresponds to the way from this objective through the prism $p$ to the plane of the mark on the plate $g$. As in the two preceding examples, there is produced in the object plane $l$ an optical boundary line constituted by the image of an edge of the slit of the diaphragm $n$. The imaging rays are directed by the prism $p$ and the wedge $q$ to the one half of the objective $a$, and the other half of the objective produces an image of the object plane $l$ in the plane of the mark on the glass plate $g$.

We claim:

1. A microscope for examining profiles of surfaces of bodies by the optical intersection method, said microscope having a housing containing a microscope objective, a system for dividing the pencil of imaging rays proceeding from said microscope objective into two partial pencils, said system lying near the exit pupil of said microscope objective, a microscope eye-piece for receiving the one of said partial pencils, a mark plate lying in the focal plane of said microscope eye-piece, a diaphragm having an opening covering a rectilinearly bounded part of the cross-sectional area of the other of said partial pencils, the distance apart of said diaphragm and that plane of said ray dividing system in which takes place the division of said pencil of imaging rays corresponding to the distance apart of said mark plate and said plane of said ray dividing system, and means for illuminating that side of said diaphragm which is remote from said ray dividing system.

2. In a microscope according to claim 1, said ray dividing system having at least one reflecting surface, said reflecting surface covering one half of the exit pupil of said microscope objective.

3. In a microscope according to claim 1, said ray dividing system having at least one refracting prism, said refracting prism covering one half of the exit pupil of said microscope objective.

OTTO MARTIN ISRAEL EPPENSTEIN.
CLEMENS MÜNSTER.